INVENTOR.
RONALD A. DARBY

Jan. 18, 1966    R. A. DARBY    3,229,509
FLOW NOISE DETECTOR

Filed May 29, 1963    3 Sheets-Sheet 2

INVENTOR.
RONALD A. DARBY

United States Patent Office 3,229,509
Patented Jan. 18, 1966

3,229,509
FLOW NOISE DETECTOR
Ronald A. Darby, Anne Arundel County, Md., assignor to the United States of America as represented by the Secretary of the Navy
Filed May 29, 1963, Ser. No. 284,269
6 Claims. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

The present invention relates to the measuring of noise entrained in fluid columns, and more particularly, relates to the measurement and evaluation of acoustic noise present in liquids flowing through pipes or conduits.

There is a need to evaluate liquid cooled internal combustion engines, pumps and all machines that circulate liquid with respect to the acoustic noise content in the fluid being circulated. Likewise, passive devices such as acoustic filters, valves, piping elbows, etc. must be described as to their effect on fluid entrained acoustical noise. These needs are particularly important for machinery installations in naval craft which expel water directly into the sea as it is mandatory not to allow acoustic noise to radiate into the sea where the enemy may detect it. Present preinstallation evaluation methods revolve around locating acoustic pressure pickups in the flow lines and recording the sound pressure spectra. This information is then used to attribute certain forcing functcions to particularly undesirable machinery or flow phenomena or it can be used to serve as design criteria for acoustic filters.

The great disadvantage of using singular or a few stationary pressure pickups to measure acoustic pressure in the fluid is that only a small portion of a necessarily very complex standing wave pattern is sampled. Thus, the probability of obtaining meaningful spectrum densities is greatly reduced. Devices which allow the transducer (pickup) to move through the flow area in order to average the peaks and nulls of the sound pressure field tend to yield faulty data because (a) the flow field is disturbed, (b) the acoustic standing wave patterns are disturbed due to the pressure of the pickup, and (c) a high level of acoustic noise is often generated due to the fluid flowing across the transducer.

Accordingly, it is among the objects of the present invention to provide novel means and methods for the measurement and evaluation of acoustic pressure and sound patterns in fluid or fluent material flowing through pipes and conduits.

It is another object of this invention to provide a novel acoustically definable reverberation chamber for use in determining the acoustic noise content in contained fluid columns.

Another object of this invention is the provision of novel means affording acoustically transparent flow sections whereby sound pressure samples are obtained by an array of pickups without disturbing or obstructing the flow of contained fluids.

Yet another object of this invention is to provide an average of samples taken of standing wave patterns produced by fluid flowing through an acoustically transparent pipe, conduit or the like.

Another object of this invention is the provision of novel means establishing minimally disturbed standing waves measurably related to conditions of fluid flow in a pipe.

Another object of the present invention is to provide novel acoustically transparent reverberating chamber means surrounding a fluid column for establishing standing waves therein of measurable intensity.

These and other objects, features and advantages of the present invention will be better understood by referring to the accompanying drawings in which like reference numerals indicate like parts, and in which.

Figure 1:
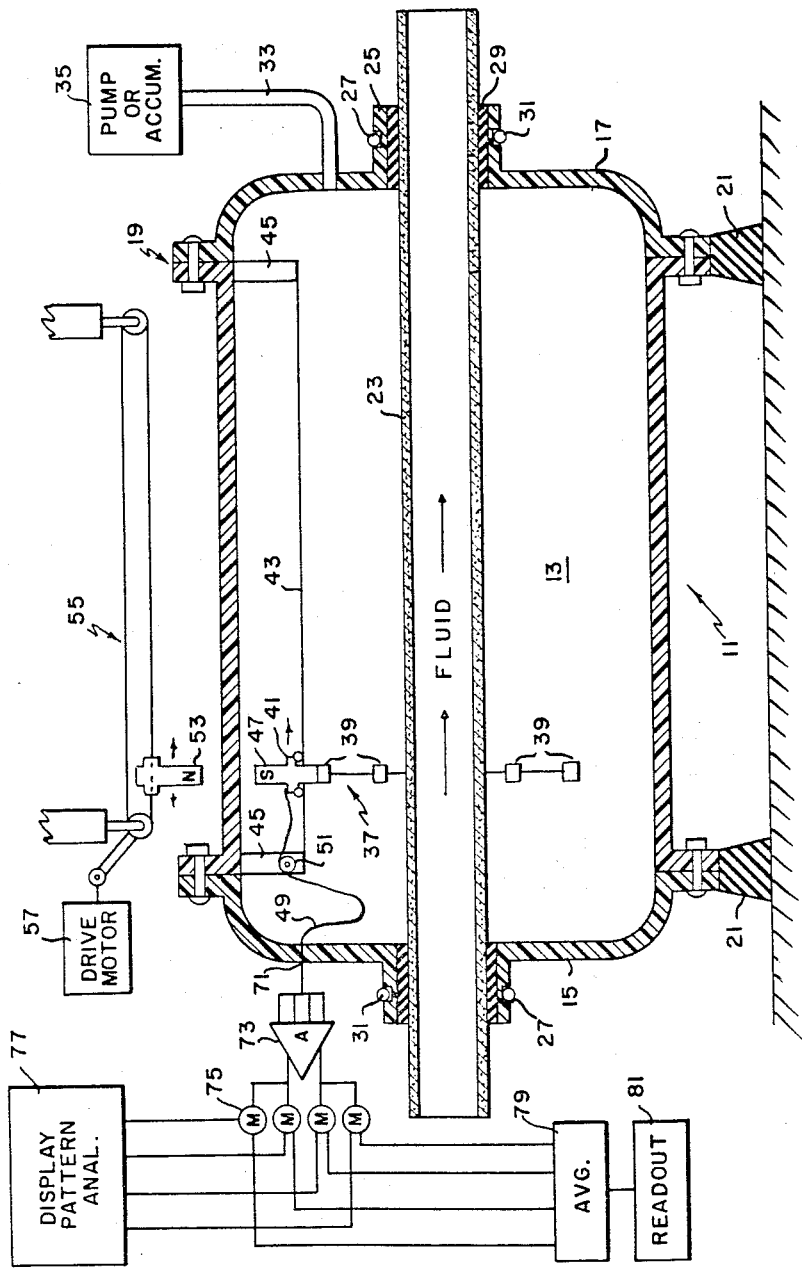
FIG. 1 is a view in longitudinal cross-section of a reverberant chamber and associated sound pressure measurement apparatus together with a block diagram of an electrical output system according to an embodiment of the invention.

Referring to FIG. 1, the flow noise detector of the invention employs a generally cylindrical tank 11 which is made of any suitable stiff non-magnetic material such as fiber glass and capable of withstanding large pressure differentials. The tank 11 may be filled with any suitable fluid. The tank 11 forms a reverberant chamber 13 and consists of two opposite removable end portions 15 and 17 respectively which are connected by means of bolts at flanges 19 to the central portion of the tank 11.

The tank 11 is horizontally disposed and is mounted at its flange portions 19 on vibration isolating supports 21 made of rubber or other suitable material. Of course, the supports 21 may be made according to any suitable known design for effectively isolating the tank 11 from its foundation.

Each of the oppositing end portions 15 and 17 of the tank is apertured coaxially to receive a pipe or conduit 23. The pipe 23 carries the flowing fluid (liquid or gas) or fluent material the noise entrainment of which is to be measured. The end portions 15 and 17 of the tank are provided with outwardly extending annular shoulders 25 each having an outer annular groove 27 therein. The pipe 23 is sealably mounted in the space surrounded by the shoulders 25 by means of rubber or deformable plastic gaskets 29 interposed between the pipe and shoulders. The gaskets 29 also provide shock and vibration isolation between the tank 11 and the pipe 23. Suitable annular clamping means 31 located in the grooves 27 provide a tight sealed fit between the pipe and tank.

The specific acoustic impedance of the pipe 23 is related to that of the fluid or fluent material flowing within. It is desirable to provide pipe which is as "acoustically transparent" as possible in relation to the fluid or fluent material flowing within the pipe.

Optimally, the pipe should present as low an acoustic impedance mismatch as possible between the fluid and the conduit material. An example of such an impedance match is where the pipe 23 is made of rubber and the fluid therein is water.

The tank end portion 17 is further apertured to receive a conduit 33 from a pump or accumulator 35 of any suitable construction so that there is no large static pressure differential between the interior of conduit 23 and the chamber 13.

By means of the foregoing arrangement, a large percentage of the acoustic energy passes through the walls of the pipe 23 into the fluid contained in the tank. The reverberant chamber 13 will contain a large percentage of this acoustic energy in the form of standing waves of a pattern primarily dependent upon the properties of the fluid in the tank and the wall geometry of the tank. The vibration isolation supports 21 isolate the tank, thereby reducing structural resonances coupling vibratory waves back into the fluid contained in the tank 11.

Figure 2:
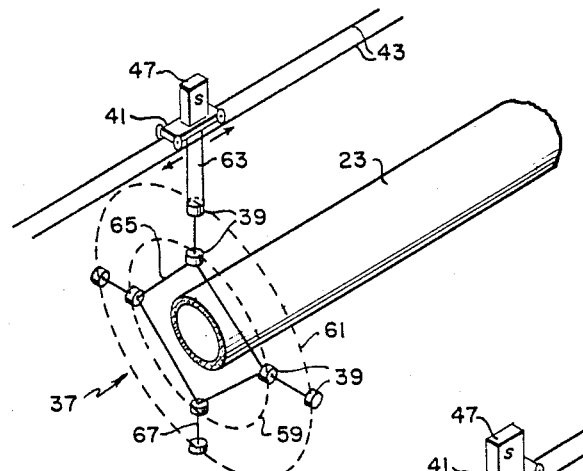
FIGS. 2 and 3 are illustrative perspective views of transducer pickup arrays for use in connection with the arrangement of FIG. 1.

In the transducer pickup system for detecting the sound pressure in the chamber 13, there is employed a fixed or mobile array 37 of several discrete pickups 39 identical in impedance characteristics. The particular arrangement of the transducers 39 in the array 37 will be discussed in greater detail in conjunction with FIGS. 2 and 3.

The entire array 37 is supported by a trolley 41 which is movable back and forth on lines 43 positioned longitudinally near the top of the chamber 13. The lines 43 may be tautly supported by a pair of rods 45 bolted or bonded to the interior chamber wall portion near opposite ends of the chamber 13.

A powerful interior permanent magnet 47 is rigidly mounted on the top of the trolley 41, the upper end of the magnet (indicated as a "south pole") being as nonengagingly close as possible to the interior surface of the upper wall of the chamber 13. The trolley 41 carries a cable 49 containing as many leads as there are transducers 39 in the array 37. The cable 49 is passed over a sheave 51 with sufficient hanging loop in the cable so that the cable is taken up as the trolley moves back and forth in the chamber.

The trolley 41 is caused to move back and forth by means of magnetic flux coupling between said interior permanent magnet 47 and a second permanent magnet 53 movably mounted exteriorly of the chamber 13.

More particularly, the exterior permanent magnet 53 is supported by an endless pulley 55 driven by a reversible electric motor 57. The exterior magnet 53 has its north pole as close as possible to the outer surface of the tank 11 so that as the magnet 53 moves, the trolley supported magnet 47 is constrained by the attractive field to move therewith. Consequently the transducer array-carrying trolley 41 moves in unison with the magnet 53.

The transducer array 37 carried by the trolley 41 may be of any convenient fixed or mobile and symmetrical or non-symmetrical arrangement depending upon the scope and nature of the desired measurements. In the array embodied in FIG. 2, the transducers 39 are arranged symmetrically about the central fluid flow axis in pipe-encircling inner and outer concentric rings 59 and 61 respectively. A depending trolley member 63 supports the uppermost outer ring transducer and the uppermost inner ring transducer is supported by a cable 49 having leads for all but the uppermost outer ring transducer. The inner ring transducers are rigidly spaced from each other by stiff cables or cable-containing tubes 65 of small diameter suitably rigidly attached or bonded to the respective transducers to form a "diamond." The three lower inner ring transducers rigidly support the three lowermost outer ring transducers by radially oriented stiff leads or lead-carrying tubes 67. Of course, the leads are combined into the cable connecting the transducers so that each transducer output is provided with an individual conductive path. In some situations, it may be desirable to combine all of the transducer outputs in the array 37 for averaging purposes, in which instance interconnected leads instead of cables may be employed.

The cable 49 is passed through the member 63 and provides means for carrying leads from all of the identical transducers 39.

Figure 3:
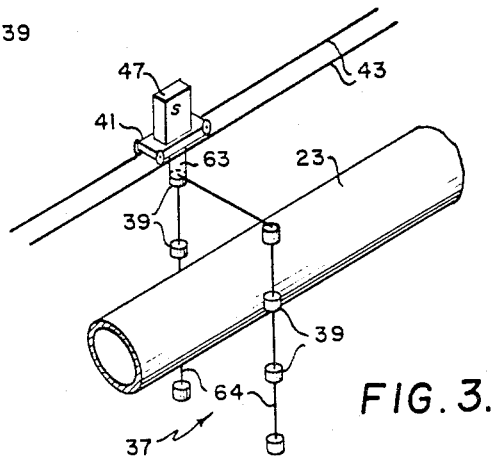

In FIG. 3 there is illustrated a simpler transducer array wherein the uppermost transducer is supported by the trolley 41 and the remaining transducers are serially hung therefrom to form two spaced vertical lines 64 of spaced transducers. Since the trolley is moved back and forth in the chamber 13 rather slowly for most purposes, it is not necessary that the transducers 39 be rigidly interconnected.

Referring again to FIG. 1, the cable 49 is passed through the chamber walls via a stuffing box 71. Each transducer output is amplified (four transducer outputs are shown for illustrative purposes only) at a suitable amplifier 73, and each amplified output is fed to monitoring or indicating means 75 for checking the operative state of each transducer. The output of each transducer is fed to a display pattern analyzer 77 which may employ a cathode ray display tube for each transducer for the purpose of displaying the effect of the standing wave pattern on each transducer 39. By means of the analyzer 77, the standing wave pattern may be checked or pre-calibrated, and the transducer array 37 adjusted for optimum results. Any other suitable display or analyzing means may be employed.

Each transducer output represents sound pressure and may be combined in an averaging circuit 79 of any suitable known design for providing a basis of determining the overall sound average pressure which is readout or indicated on any suitable readout means 81.

In operation, the material of the pipe 23 is first selected for impedance matching with the fluid or fluent material to be employed in the test. In the majority of situations water is the fluid used, and rubber is an appropriate piping material.

With the end portion 15 removed the transducer array to be used is positioned and electrically connected into the system output. The pipe 23 is inserted and the end portions 15 and 17 sealed thereto. The pipe 23 is then connected into the system under test. The reversible motor 57 may be manually controlled or actuated for back and forth movement of the magnet 53 my means of a programmer. With the drive motor 57 energized, the resulting movement of the magnet 53 on the pulley 55 causes movement of the magnet 47 in unison therewith, thereby moving the trolley-supported transducer array 37 therewith. The sound pressure information picked up by the transducer 39 is then processed in the output system as previously explained to obtain average sound pressure measurements and/or standing wave pattern information.

Figure 6:
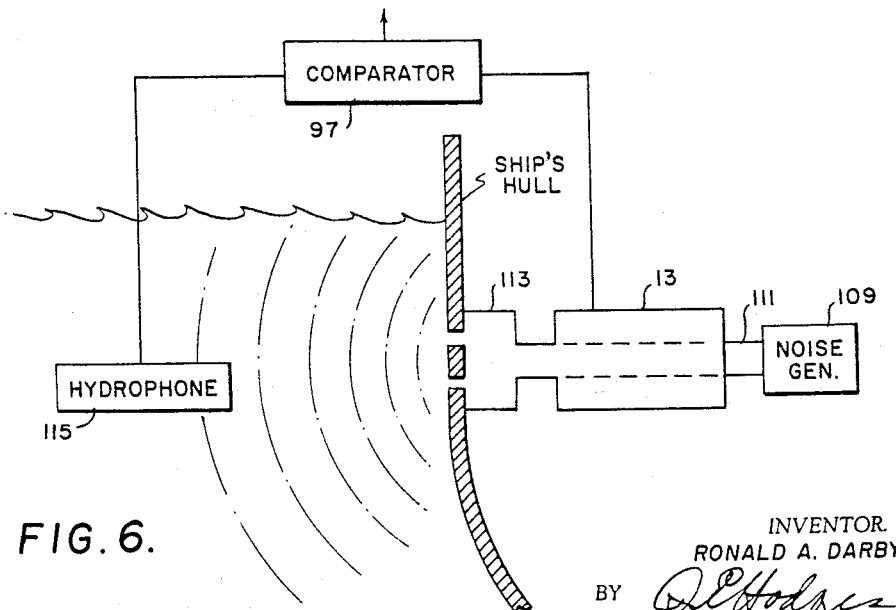
FIGS. 4–6 are diagrammatic views of other forms of the invention embodied in FIG. 1.
Figure 4:
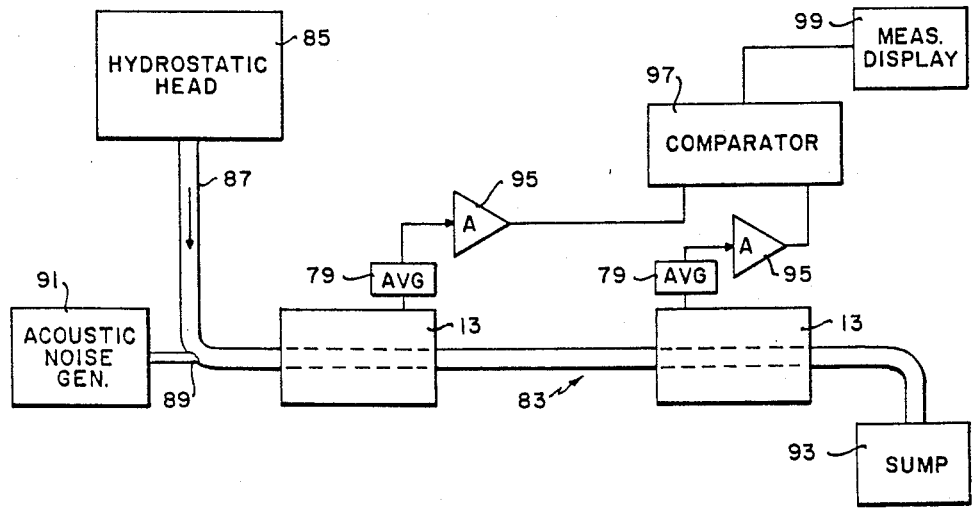
Figure 5:
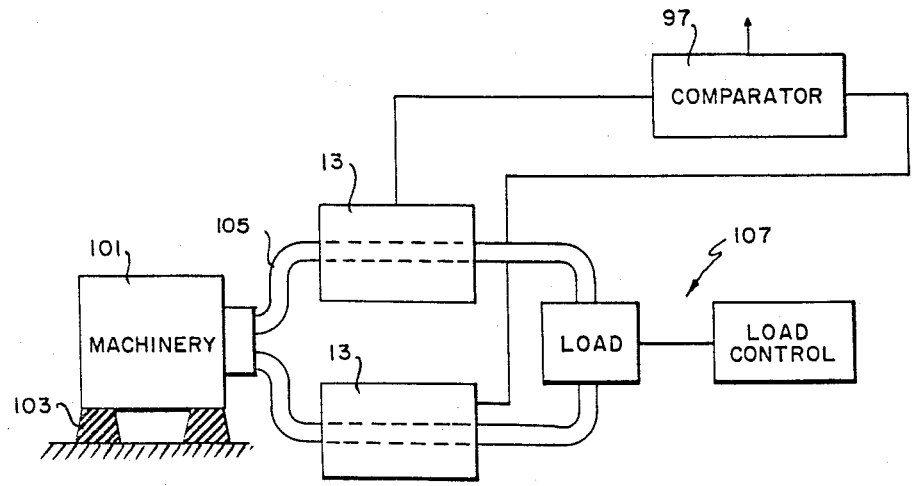

The novel reverberation sound pressure measuring arrangement of FIG. 1 may be modified to provide useful sound pressure measurements in varying situation such as those shown in FIGS. 4, 5, and 6 respectively. In FIG. 4, the efficiency of an acoustic filter 83 or similar device is measured in terms of the ratio of sound power output to sound power input. A hydrostatic head 85 supplies fluid for flow through a system conduit 87. At a bend in the conduit 87 is a diaphragm or other suitable sound projector 89 mounted in the wall of the conduit. The diaphragm 89 is driven by an acoustic noise generator 91 of any suitable design. Entrained noise is therefore introduced into the fluid flowing in conduit 87 via the diaphragm 89.

Fluid in the conduit 87 is then passed through a first flow noise detector 13 (FIG. 1) for providing a measure of the input entrained noise in terms of sound pressure. The device 83, such as an acoustic filter to be calibrated or tested, is positioned between the first flow noise detector 13 and a second flow noise detector 13 (FIG. 1) so that the fluid is passed therethrough. The sound pressure measured in the second noise detector represents the entrained flow noise sound pressure as reduced or increased by the device 83 under test. The fluid is then passed to a sump 93 for recirculation if desired.

The transducer array outputs of each flow noise detector 13 are averaged as explained in connection with FIG. 1 and amplified if necessary by suitable devices 95. The two averaged, amplified transducer array outputs are then fed to an amplitude ratio detector or comparator 97 of any suitable design for display or indication by a suitable display device 99.

The arrangement of FIG. 5 provides a measure of noise level of machinery, for example, of piston or jet engines, turbines, and the like. As shown in FIG. 5, the machinery 101 to be tested is suitably mounted for vibration isolation by supports 103. The working or circulating fluid of the machinery 101 is passed in a loop via a recirculating conduit 105 through a first flow noise detector 13 (FIG. 1), a variable system load simulating system 107, a second flow noise detector 13 (FIG. 1) and back into the machinery. The effect of the variable system load 107 is compared with the machinery noise in the same manner as explained in conjunction with FIG. 4, the transducer array outputs of the reverberant measuring chambers 13 thus being respectively averaged and compared in a comparator 97.

An arrangement for measuring and evaluating noise produced by hull part connections and sea chests of naval vessels is depicted in FIG. 6. A noise generator 109 located within the vessel supplies entrained noise to a fluid column 111 via suitable sound projecting means such as one or more diaphragms. A reverberant measuring chamber 13 (FIG. 1) measures the sound pressure produced therein by the entrained fluid flow noise. The fluid is then passed through the ship's hull via an outlet configuration 113 under test. A hydrophone 115 of conventional design which may be depended from the vessel is suspended in the sea water at positions in the vicinity of the outlet configuration 113 so that the radiated noise pattern in terms of measured sound pressure may be compared and evaluated in conjunction with the known input sound pressure as measured by the novel detector 13 located in the vessel. In this manner, a realistic and useful indication of the efficiency of outlet configuration may be obtained.

Obviously other arrangements and uses of the novel flow noise detector of the present invention will become apparent to those skilled in the art.

It is appreciated that by the present invention the acoustical standing wave pattern produced by the fluid column can be adequately sampled and averaged. Sound pressure information can be obtained for comparison or analysis without disrupting the normal fluid or fluent material flow conditions and with only negligible or minor disturbance to the standing wave pattern.

Absolute sound power or pressure levels may be obtained by carefully calibrating the reverberant chamber. After calibration, the reverberant chamber may be connected into the system or to the device under test.

The reverberation tank 11 may also be calibrated prior to testing. This may be carried out by placing a variable frequency acoustic signal projector producing a signal of known characteristics at an aperture of one of the tank end portions 15, 17, and by placing an acoustic transducer of known impedance at the aperture of the other tank end portion. When the variable frequency sound projector is energized, the most powerful volume modes as well as structural effects may be observed.

Obviously many modifications and variations of the present invention are possible in the light of the above teachings. It is therefore to be understood that within the scope of the appended claims, the invention may be practiced otherwise than as specifically described.

What is claimed is:

1. A flow noise detector for determining the level of entrained noise in a confined moving fluid column comprising:
   a fluid filled reverberation chamber surrounding the confined moving fluid column whereby standing waves caused by noise entrained in the fluid column are caused to occur in said chamber;
   means extending into said chamber for measuring the sound pressure of the standing waves therein,
   said means comprising an array of sound pressure pickups movable to positions in said chamber for sampling the standing waves;
   driving means located outside said chamber;
   means coupling said array to said driving means for movement in unison therewith; and
   output means electrically connected to said pickup array.

2. The detector according to claim 1 but further characterized by said output means comprising averaging means for producing the average value of the sound pressures detected in said chamber.

3. The detector according to claim 1 but further characterized by the coupling means comprising:
   an exterior permanent magnet movable with said drive means;
   an interior permanent magnet movably mounted in said chamber in attracted relation to said exterior magnet; and
   mounting means connecting said pickup array to said interior movable permanent magnet for movement therewith.

4. The detector according to claim 3 but further characterized by said mounting means comprising a trolley carrying said interior permanent magnet and located within said chamber.

5. A flow noise detector for determining the level of entrained noise in a confined moving fluid column comprising:
   a fluid filled reverberation chamber surrounding the confined moving fluid column whereby standing waves caused by noise entrained in the fluid column are caused to occur in said chamber;
   means extending into said chamber for measuring the sound pressure of the standing waves therein, said means comprising an array of sound pressure pickups movable in said chamber for sampling the standing waves in various positions;
   said array of pickups comprising a plurality of pickups surrounding the confined fluid column and arranged in a plane essentially perpendicular to the direction of fluid flow.

6. The detector according to claim 5 wherein said array is symmetrical about the central axis of fluid flow.

References Cited by the Examiner
UNITED STATES PATENTS

| | | | |
|---|---|---|---|
| 1,834,875 | 12/1931 | Schaafhausen | 181—.5 |
| 2,151,203 | 3/1939 | Hartig | 73—69 |
| 2,844,210 | 7/1958 | Milne | 73—69 |
| 3,054,592 | 9/1962 | Christoph | 181—.5 |
| 3,055,209 | 9/1962 | Reid et al. | 73—40.5 |

RICHARD C. QUEISSER, *Primary Examiner.*

LAWRENCE R. FRANKLIN, *Assistant Examiner.*